Figure 1:
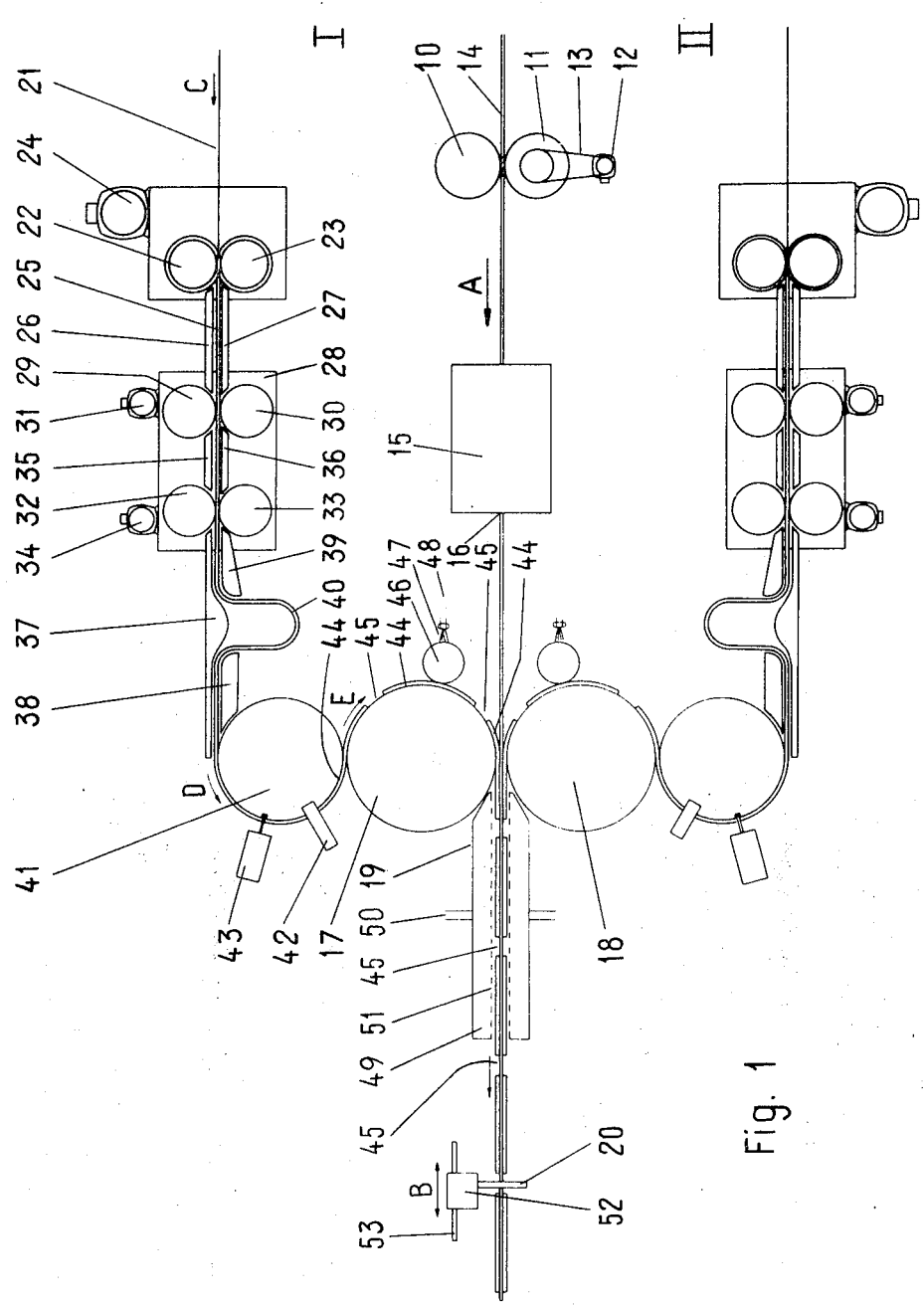

United States Patent [19]
Jonason et al.

[11] 3,762,031
[45] Oct. 2, 1973

[54] METHOD FOR MANUFACTURING ELONGATE HEAT-EXCHANGE ELEMENT BLANKS

[75] Inventors: Karl Gunnar Jonason; Karl Harry Karlsson, both of Vasteras; Ake Gustof Vilhelm Remning, Finspang, all of Sweden

[73] Assignee: Granges Essen Aktiebolag, Vasteras, Sweden

[22] Filed: Feb. 4, 1971

[21] Appl. No.: 112,729

[30] Foreign Application Priority Data
Feb. 5, 1970 Sweden.............................. 1499/70

[52] U.S. Cl.............. 29/471.3, 29/157.3 D, 29/480, 29/482, 113/118 D
[51] Int. Cl........................................... B23k 31/02
[58] Field of Search..................... 29/475, 480, 482, 29/471.1, 471.3, 472.3, 157.3 D; 113/118 D

[56] References Cited
UNITED STATES PATENTS

| | | | |
|---|---|---|---|
| 2,371,754 | 3/1945 | Gillum et al.................. | 29/471.3 X |
| 3,123,905 | 3/1964 | Thomas............................ | 29/475 X |
| 3,340,588 | 9/1967 | Muellar et al..................... | 29/480 X |
| 3,362,056 | 1/1968 | Preller et al................... | 29/471.1 X |
| 3,389,455 | 6/1968 | Clark............................... | 29/475 X |
| 3,568,301 | 3/1971 | Shibata.............................. | 29/471.3 |
| 3,600,794 | 8/1971 | Shibata et al.................. | 29/471.3 X |

Primary Examiner—J. Spencer Overholser
Assistant Examiner—Richard B. Lazarus
Attorney—Waters, Roditi & Schwartz

[57] ABSTRACT

A method and apparatus for manufacturing elongate heat-exchanger blanks composed of a basic substrate profile having at least one length of corrugated metal foil strip mechanically bonded thereto. A basic elongate profile string is advanced at a predetermined speed along a fixed path and at least one strip corrugating device is arranged to produce a continuous length of corrugated strip and to feed the strip into the path of the basic profile via a number of corrugated strip cutting and feed means. These latter means operate cyclically to cut the strip at predetermined intervals and to join the cut lengths of strip to the basic profile string in spaced relationship at a frequency corresponding to the intervals.

12 Claims, 2 Drawing Figures

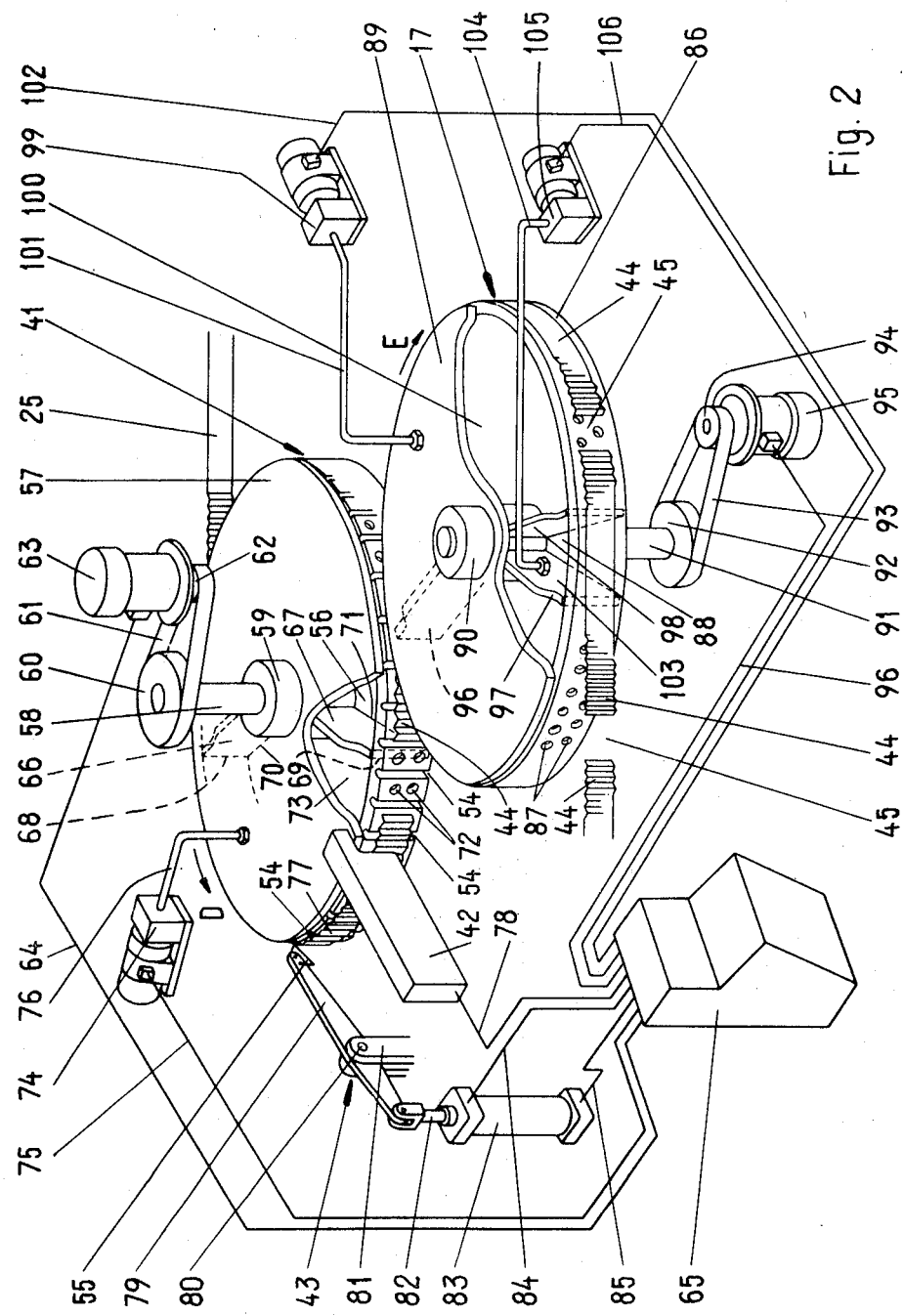

3,762,031

METHOD FOR MANUFACTURING ELONGATE HEAT-EXCHANGE ELEMENT BLANKS

It has previously been proposed to use an elongate heat-exchange element blank in the construction of heat-exchangers for cooling or heating purposes, preferably for use in motor vehicles, the blank being provided along its length with surface enlarging means in the form of metal strips folded transversely of the longitudinal axis thereof and which are in metallic contact with the basic profile at regular intervals in the longitudinal direction thereof.

The present invention relates to a method of mechanically manufacturing elongated heat-exchange element blanks of the type formed of a basic profile of arbitrary length provided with at least one corrugated metal foil strip arranged along said basic profile and in metallic contact therewith.

The method according to the invention is characterized by the steps of feeding the profile in its longitudinal direction at a predetermined speed along a movement path and feeding together therewith at least one continuous strip length of corrugated metal foil in an individual path, cutting predetermined lengths from the front end of the strip in a cyclically repeated process, and placing the cut strip lengths in intervals in abutment with the advancing basic profile and soldering said cut lengths to the basic profile at mutual points of contact, whereafter the basic profile is cut at said intervals.

The invention also relates to an apparatus for manufacturing elongate heat-exchanging element blanks in accordance with the method of the invention.

The apparatus according to the invention is mainly characterized by means for feeding the basic profile in one longitudinal direction in an individual movement path and means for feeding together therewith a corrugated metal foil strip material into abutment with said profile and entrained by the movement thereof, said feeding means being coordinated with a cyclically operating clipping or cutting means for cutting a predetermined length of metal foil strip from the end of the advanced metal foil strip material and with means for separating adjacent ends of the cut strip length at determined intervals and means for placing the separated strip lengths against the advancing basic profile and for soldering said separated strip lengths to said basic profile, and means for severing the basic profile at the interspaces between the strip lengths soldered thereon.

The invention will now be described in more detail with reference to an embodiment thereof diagrammatically illustrated in the accompanying drawing, additional characteristic features of the invention being disclosed in connection therewith.

FIG. 1 shows diagrammatically and in plan view an exemplary apparatus for carrying out the method of the invention, and FIG. 2 illustrates in perspective and in more detail the means illustrated in FIG. 1 for advancing and severing a corrugated metal foil strip material and for further advancing the severed lengths of corrugated strip material utilized as surface enlarging means and which are spaced apart in the direction of movement.

In the exemplary embodiment illustrated in FIG. 1, reference numerals 10 and 11 indicate two feed rollers, of which at least one is driven by a motor 12 through an appropriate transmission, for example a belt or chain transmission 13. The rollers 10 and 11 are arranged to advance an elongate basic profile in the direction of arrow A, preferably at a predetermined speed, the basic profile being an elongate element of solid or hollow construction. It lies within the scope of the invention to connect the apparatus of the invention to an apparatus for producing basic profiles continuously by known methods, such as extrusion or shaping of strip material to basic profiles.

For reasons of space, however, it is often of advantage to produce and pre-treat the basic profile material, irrespective of whether it is of solid or hollow construction, in separate processes and to convey the finished basic profile material from a place of storage to a starting station, from where it is fed in between the rolls 10 and 11.

In the following description it is assumed that the basic profile material 14, advanced in the direction of arrow A FIG. 1, FIG. 1 has been previously provided with a coating of an appropriate solder. It is also preferred, in accordance with the invention, that the material of the profile is copper or a copper alloy, which from the heating aspect and soldering aspect is to be preferred, although of course the choice of metal is not restricted in this way, but can be broadened to include other metals suitable in the context.

In the exemplary embodiment, the profile material 14 is fed through a pre-heat furnace 15, in which the solder on the profile is heated to a molten condition before it leaves the furnace 15, through discharge opening 16, whereupon the strip is fed continuously in a rectilinear path in the direction of arrow A between two special rollers 17 and 18 and is further conveyed through a cooling and holder-down means, generally indicated at 19, to be finally cut by means of a cutting device 20, which operates in accordance with the flying shear technique, i.e., is able to move in the directions shown by the double arrow B.

In the exemplary embodiment illustrated in FIG. 1, it is intended that the basic profile 14 is provided on two sides with surface enlarging means in the form of corrugated metal strip, suitably made of a metal of good thermal conductivity. According to the invention, a foil strip can be used, for example of a thickness of between 100 $\mu$m – 10 $\mu$m suitably between 35 and 15 $\mu$m, and preferably 25 $\mu$m. Metal foil strip of such small thickness, however, is extremely subject to deforming and should therefore be handled mechanically, to prevent the strip from being deformed during the corrugating operation and during transport to the soldering position on basic profile 14.

Arranged on either side of the advanced profile 14 in FIG. 1 are duplicate means for handling and conveying the corrugated strip material to a position between the two special rollers 17 and 18. The two handling and conveying means are indicated generally at I and II respectively, and since these means are completely identical to each other, although allochiral, only the means I will be described below, while it is assumed at the same time the function of the two means also coincides in all parts.

The reference numeral 21 indicates a metal strip, suitably copper or copper alloy, advanced in the direction of arrow C. In the described example, this strip is presumed to be of foil thickness. A preferred thickness both from the heating aspect and from one of cost, is 25 $\mu$m.

As shown in FIG. 1, the strip 21 is fed into a folding means containing two meshing cogs 22 and 23, driven by a motor 24. The strip is folded during its passage between the two cogs, and leaves the cogs in the form of a corrugated foil strip 25, which is guided in a path between two guide plates 26 and 27 into a compacting means, generally indicated at 28. The compacting means includes two groups of feed rollers, namely rollers 29 and 30, driven by a motor 31, and rollers 32 and 33, driven by a motor 34. The drive motors are arranged to drive their respective roll pairs in a manner whereby the roll pair 32, 33 has a lower peripheral speed than the roll pair 29 and 30. Consequently, the corrugated foil strip 25, during its passage between the guide plates 35 and 36, will be subjected in the path between the two pairs of rolls to a permanent compression in the direction of movement, owing to the disparity in peripheral speeds between the two pairs of rolls. In order to permit interruption in the forward movement of the corrugated foil strip 25 at a later stage in the process, there are arranged guide means 37, 38 and 39 which smoothly lead the corrugated foil strip 25 into a loop 40, i.e., a so-called strip magazine. This loop can be permitted to grow considerably, but can also be consumed until it reaches the guide member 37. The corrugated strip is finally passed from the strip magazine, between the guide member 37 and the guide member 38, in a tangential direction towards and in contact with a roll 41 and is sucked firmly against the periphery of said roll and entrained therewith in the direction of rotation shown by the arrow D. The roll 41 is assumed to be rotated intermittently under the control of a pulse counter 42, which is arranged to control the movement of roll 41 in a manner whereby it rotates through determined angles of rotation and stops periodically for determined periods of time. This intermittent movement of the roll 41 is intended to provide stop intervals, during which a clipping or cutting means 43 can be made to cut determined lengths of the corrugated foil strip 25 advanced by the roller. Each cut strip foil length 44 is still retained by the suction effect against the periphery of roller 41 and is fed in between the roller 41 and the special roller 17, which also exercises a suction effect. FIG. 1 illustrates such a metal foil length 44, and it should be observed that the suction effect from the roller 41 on this length 44 ceases to act on those portions of the length situated on the right side of the roll gap, the suction effect on this side being, instead, replaced by a blowing effect, which forces the length to release contact with the roller 41 so that it can instead be brought into contact with and sucked firmly against the special roller 17. The special roller 17 and the roller 41 are driven at substantially the same peripheral speed, so that the foil strip lengths do not change their shape. The stop periods of the roller 41 must be arranged, however, so that each cut foil strip length is substantially either on the roller 41 or on the special roller 17 during the stop period. Because the special roller 17 rotates continuously, the last cut foil strip length transferred thereto is moved through a distance which corresponds to the stop interval of the roller 41, whereby the severed strip lengths are spaced apart by the intervals 45. During the passage of the length 44 on the special roller 17 in the direction of arrow E towards the basic profile 14, the wave crests on said length are brought into contact with a flux applying roller 46, the flux being applied to said roller in the form of a spray 47 from a nozzle 48.

The foil strip lengths 44 are advanced in sequence into abutment with the profile 14 between the special rollers 17 and 18, the suction effect exerted by the special roller 17 ceasing completely subsequent to the position where the foil strip length passes to the left side of the roll gap, where the suction effect exerted by the roller 17 is replaced by a blowing force, so that the length 44 is loosened from the periphery of the special roller 17. Because the solder on the basic profile fed through the roll nip is still in a molten condition, the fluxed crests of the corrugated foil strip lengths are brought into ideal contact with the basic profile. In order to solidify the solder quickly and to obtain a good joint between the corrugated strip length 44 and the basic profile 14, the profile and the foil strip lengths in abutment therewith are passed into the cooling and holder-down means 19, which consists of a guide means, generally indicated at 49, where air under pressure is fed through the inlet 50 and discharged through a perforated wall 51 of the guide means 49, thereby providing the holding and cooling effect. During its passage through the cooling and holder-down means, the solder solidifies and the corrugated strip lengths are metallically bonded to the basic profile, the bond causing each corrugated fold to be stronger and less liable to deform. In the process described above, the basic profile is not covered along its entire length with the corrugated strip, since the aforementioned intervals 45 are continually repeated as the profile is advanced. Since the elongated basic profile 14, provided in the aforementioned manner with surface enlarging means, is to be cut into lengths, the system is provided with the aforementioned cutting means 20, which together with its drive motor 52 is positioned on guides or the like 53, so that the whole assembly is able to follow the feeding movement of the profile at the same speed as said profile during the cutting period while the cutting means, subsequent to being withdrawn, can be moved to a suitable starting position to effect cutting of the basic profile at the following interval 45 while entraining the profile in the feed direction A.

Since FIG. 1 merely is a diagrammatic view of a plant according to the invention, it does not describe in sufficient detail how the special important parts of the plant are constructed. The machine parts which are of particular importance in the apparatus are the two rollers 41 and 17. For a better understanding of their construction and orientation in the system, reference is made to the perspective view shown in FIG. 2, which includes the roller 17 and the roller 41. FIG. 2 also shows the cutting means 43 and the pulse counter 42, the corrugated foil strip 25, the cut foil strip lengths 44 and the intervals 45.

As will be seen from FIG. 2, the roller 41 consists of a ring which is provided with a number of uniformly spaced recesses 54 arranged to cooperate with the cutting tool 55 of the cutting means 43. In the exemplary embodiment, the ring is secured to a bottom disc 56, and the thus formed bowl shaped construction is covered with a stationary, circular annular plate 57, which abuts relatively tightly at its peripheral portions with the edge of said ring. The bottom 56 is attached at its center to a drive shaft 58, which in turn is journalled in a centrally arranged collar or bushing 59, which similar to the disc 57 is stationarily arranged. The shaft 58 is provided with a drive wheel 60 which, by means of a belt or the like 61 and a driving pulley 62 is driven by an electric motor 63. The motor is energized through electric line 64, which is connected to a plant control and operating panel 65. Extending radially from the bushing 59 within the space defined by the ring, the bottom 56 and the disc 57 is a wall 66 and a wall 67, which walls are freely movable with respect to the ring at the outer ends 68 and 69 respectively thereof, but arranged relatively tightly against the inside thereof. Furthermore, the lower edges 70 and 71 respectively of the wing-like walls shown in the drawing are also arranged freely movable relative to the bottom 56. Because of this arrangement, the walls 66 and 67 are thus stationary in predetermined positions, while the ring of the roller 41 and its bottom 56 are caused to rotate in the direction of arrow D, as shown in FIG. 1. Furthermore, it should be noted that the tooth-like portions of the ring situated between the recesses 54 are provided with holes 72, which provide communication between the outside of the ring and a sector-shaped suction chamber 73 formed between the walls 66 and 67, when respective openings are rotated between the wall edge surfaces 68 and 69. A suction is maintained in the chamber 73 by means of an air pump 74, which is electrically connected via electric line 75 to the control and operating panel 65. The suction side of the pump 74 communicates, via a bent pipe 76, with the chamber 73, whereby air is sucked into the chamber through the openings 72, which causes the forward end 77 of the foil strip 25 to be sucked firmly against the ring, provided that the end of the strip is located on the periphery of the roller between the wall edge surfaces 68 and 69. The pulse counter 42, which extends over the disc 57 and which in other respects is freely movable relative to the roller 41, is connected via a line or cable 78 to the control and operating panel 65. The pulse counter, for example, is constructed and positioned to respond to each tooth-like projection between the recesses 54 on the ring passing the same, and, subsequent to a predetermined number of tooth-like projections passing the counter, it transmits a signal to the panel 65, instructing said panel to stop the electric motor 63, and therewith rotation of the roller 41, for a predetermined period of time. During this stop period, the cutting tool 55 is operated to sever the end 77 of the strip. The tool passes through a recess 54 on the ring, in register with the cutting tool, first in one cutting direction and then in return direction to the starting position for the next cutting operation.

In the exemplary embodiment, the cutting tool 55 in the cutting means 43 is mounted on a lever 79, which is pivotally mounted on a shaft 80 suspended in a bearing bracket 81. The lever 79 is pivotally connected at the end opposite the cutting tool 55 with a piston rod 82 which extends from a pneumatic or hydraulic pressure cylinder 83, the cylinder being connected to the control panel 65 via lines 84 and 85. It is not, however, necessary in accordance with the invention to use a cylinder arrangement, since this arrangement can be replaced with an electrically activated armature, in case which the lines 84 and 85 will naturally conduct electricity instead of a pressure medium.

When the pulse counter 42 has subsequently stopped rotation of the roller 41 by transmission of a signal to the control panel, a signal is also transmitted to the cylinder arrangement 83, so that the piston rod 82 is lifted and the lever 79 is pivoted about its bearing 80, whereupon the cutting tool 55 cuts the strip 25 and then returns to its starting position, as illustrated in the Figure. Subsequent to effecting the aforementioned operations, the electric motor 83 is again activated and the severed length of foil strip and the subsequent end 77 of the foil strip is carried by the ring while being held thereto by the aforementioned suction effect.

As the severed foil strip length 44 rotates beyond the wall 67, the suction effect acting thereon from the chamber 73 ceases, whereby the foil strip length 44 enters the gap between the roller 41 and the special roller 17, this latter roller also being equipped with a suction means, so that the foil strip length 44 is drawn into abutment with the periphery of the roller 17.

Similar to the roller 41, the roller 17 is constructed of a ring 86 of a slightly different design than the ring of roller 41. The ring 86 is perforated around its periphery by a number of apertures 87. The ring 86 is connected to a bottom disc 88, and is covered by a stationary circular disc 89 secured to a bushing 90. The bushing 90 forms a bearing for a drive shaft 91 which is securely connected to the bottom disc 88 and thus drives the ring 86 in the direction of arrow E, as illustrated in FIG. 1. The driving shaft 91 supports at its lower end, as shown in the Figure, a driving pulley or the like 92, which via a belt or the like 93 and an additional drive pulley 94 is driven from an electric motor 95, which obtains its power by means of a cable 96 via the panel 65. The motor 95 is arranged to drive continuously the ring 86 at approximately the same peripheral speed as the ring of roller 41. In the bowl-shaped structure defined in the roller 17 by the ring 86 and the bottom disc 88 are arranged radial wings or wall portions 96, 97 and 98, similar to the construction of roller 41. A suction is maintained in the sector-shaped chamber formed between the wall 96 and the wall 98, by means of a pump 99 which communicates with the aforementioned space, here indicated at 100, by a pipe 101. The motor to the pump 99 is connected with the panel 65 by means of an electric cable 102, the pump being supplied with power from the panel 65.

Formed between the walls 97 and 98 is a considerably smaller sector-shaped chamber 103, which is connected via a pipe 104, which passes through the disc 89, with a motor-driven compressed air pump 105 which by a cable 106, is connected to the panel 65, from which it obtains its driving power.

When the severed foil strip length 44 has passed the wall 67 in the roller 41 it is no longer subjected to the suction in chamber 73 in the roller 41, and instead will rapidly be drawn to the periphery of the ring 86 and is carried in the direction of rotation of arrow E while being pulled from the roller 41, the suction in the chamber 100 maintaining the strip in abutment as long as it rotates between the wall 96 and the wall 98. When the severed foil strip length 44 passes beyond the wall 98 and is positioned in front of the chamber 103 it is subjected to a blowing effect, whereby it is separated from the ring 86 and continuously in a tangential path away from the ring 86, towards the cooling and holder-down means 19 shown in FIG. 1.

Since the movement of roller 41 is intermittent and said roller is stopped cyclically during the cutting interval while the ring 86 of roller 17 continues to rotate, the severed foil strip length 44 will be advanced during the cutting interval, whereby the space interval 45 illustrated in the drawing is obtained. The spaced foil strip lengths 44 are then fed away from the ring 86, retaining the distance therebetween, and are bought into abutment with the advancing basic profile 14 as described with reference to FIG. 1 (see FIG. 1).

By means of the described method and with the assistance of the described apparatus it is possible, without damaging the extremely thin corrugated foil strips and without manual interference, to advance the severed foil strip lengths at predetermined intervals to soldering position with respect to the basic profile. Subsequent to metallically bonding the corrugated strips to the basic profile, by soldering or the like, each arcuate fold in the strips has an improved strength, thereby enabling the finished heat exchange element blanks to be handled manually.

The invention is not restricted to the illustrated and described embodiment, but can be modified within the scope of the following claims.

What we claim:

1. A method of manufacturing elongate heat exchange element blanks of the type comprising a base element having arranged therealong and in metallic contact therewith at least one corrugated metal foil strip, said method comprising feeding an elongated base element in a longitudinal direction at a predetermined speed, periodically feeding at least one continuous strip of corrugated foil along a separate path of travel from the base element but at the same time thereas, cutting from the strip of foil during each period in which the advance of the foil is halted a portion at the front end of the strip, continuously removing successive cut portions of the strip to advance the portions at spaced intervals away from the remainder of the strip, feeding said cut portions of the strip along a path in abutment with the advancing base element at intervals therealong, soldering said cut portions to the base element at mutual points of contact, and thereafter cutting the base element in the intervals between the cut portions which are soldered to the base element.

2. A method as claimed in claim 1 comprising applying suction to the strip to advance the same along its path of travel and to hold the strip in place during the cutting operation, and limiting the region where the suction is applied to the strip so that no suction prevails at the location where the cut portions of the strip are removed from the remainder of the strip thereby facilitating removal of such cut portions.

3. A method as claimed in claim 2 wherein the spacing between successive cut portions fed to the base element is controlled by regulating the time period during which the foil is halted and the portions cut therefrom.

4. A method as claimed in claim 2 wherein the corrugated strip is advanced on a movable transport surface which is driven periodically, the strip being retained against said surface and carried therewith by said suction.

5. A method as claimed in claim 4 wherein the cut portions are drawn from the strip and fed onto a second transport surface which is driven continuously.

6. A method as claimed in claim 5 comprising separating the cut portions from the strip advanced by the periodically driven transport surface by blowing the cut portions away from the periodically driven transport surface.

7. A method as claimed in claim 5 comprising applying suction to the cut portions to hold the same against the second transport surface.

8. A method as claimed in claim 6 comprising forming the transport surfaces on rotating members whose linear speed at said surfaces is substantially the same, whereby the strip and the cut portions are fed at the same speed.

9. A method as claimed in claim 8 comprising effecting the cutting of the strip after the latter has undergone a predetermined length of travel by said first transport surface.

10. A method as claimed in claim 8 wherein the cut portions are fed to the advancing base element by the second transport surface.

11. A method as claimed in claim 10 comprising applying molten solder to the cut portions and cooling the solder after the cut portions have been brought into contact with the base element to establish metallic contact between the base element and the cut portions.

12. A method as claimed in claim 11 comprising advancing a substantially smooth strip of metal foil, deforming said strip to form repeated transversely extending folds or loops, compressing the thus formed strip in its longitudinal direction so that the folds are raised and brought permanently into close proximity to form said strip of corrugated foil, feeding the strip into a loop forming a magazine, advancing the strip after said loop onto a perforated intermittently rotated suction drum so that the strip is periodically fed in cyclically repeated intermittent rotary movements alternating with predetermined stop periods, the strip carried on the drum being severed during the stop periods to form said cut portions, said cut portions being transferred at spaced intervals to the perforated periphery of a second, constantly driven suction drum, the cut portions being sucked firmly against the latter suction drum and advanced thereby, towards theadvancing base element, applying molten solder to the cut portions, removing said portions from the second drum and feeding the same into abutment with the advancing base element, cooling the solder to solidify the same whereafter the base element is cut in the intervals between the corrugated cut portions soldered to the base element.

* * * * *

UNITED STATES PATENT OFFICE
CERTIFICATE OF CORRECTION

Patent No. 3,762,031          Dated  October 2, 1973

Inventor(s) Karl Gunnar Jonason, et al.

It is certified that error appears in the above-identified patent and that said Letters Patent are hereby corrected as shown below:

On the cover sheet, item [75] the third inventor's name should read as follows:

-- Ake Gustaf Vilhelm Remning --;

Item [73] should read as follows:

-- Assignee: Granges Essem Aktiebolag, Vasteras, Sweden --.

Signed and sealed this 30th day of April 1974.

(SEAL)
Attest:

EDWARD M.FLETCHER,JR.
Attesting Officer

C. MARSHALL DANN
Commissioner of Patents

FORM PO-1050 (10-69)